United States Patent [19]

Willhite

[11] Patent Number: 4,506,468

[45] Date of Patent: Mar. 26, 1985

[54] FISH ALERTER

[76] Inventor: Emzlie A. Willhite, 1840 Pleasant Hill Rd., Sebastopol, Calif. 95472

[21] Appl. No.: 550,845

[22] Filed: Nov. 14, 1983

[51] Int. Cl.³ .............................................. A01K 97/10
[52] U.S. Cl. .......................................... 43/17; 43/21.2
[58] Field of Search ...................... 43/17, 21.2, 15, 16

[56] References Cited

U.S. PATENT DOCUMENTS

| | | | |
|---|---|---|---|
| 3,156,997 | 11/1964 | Smith | 43/17 |
| 3,560,969 | 2/1971 | Fleeman | 43/17 |
| 3,646,697 | 3/1972 | Jennings | 43/17 |
| 4,142,316 | 3/1979 | Greer | 43/17 |
| 4,154,015 | 5/1979 | Holland | 43/17 |
| 4,202,125 | 5/1980 | Kovacs | 43/17 |

Primary Examiner—Gene P. Crosby
Attorney, Agent, or Firm—Townsend and Townsend

[57] ABSTRACT

A fishing pole holder and line tension alarm wherein a coil spring inside a tube holds the handle of the pole. Tension on the fishing line in a radial direction outward from the holder bends the coil spring against the tube and closes an electrical circuit to activate an alarm. A sleeve surrounding and adjustable along the length of the spring regulates the line tension necessary to bend the spring and close the alarm circuit.

14 Claims, 4 Drawing Figures

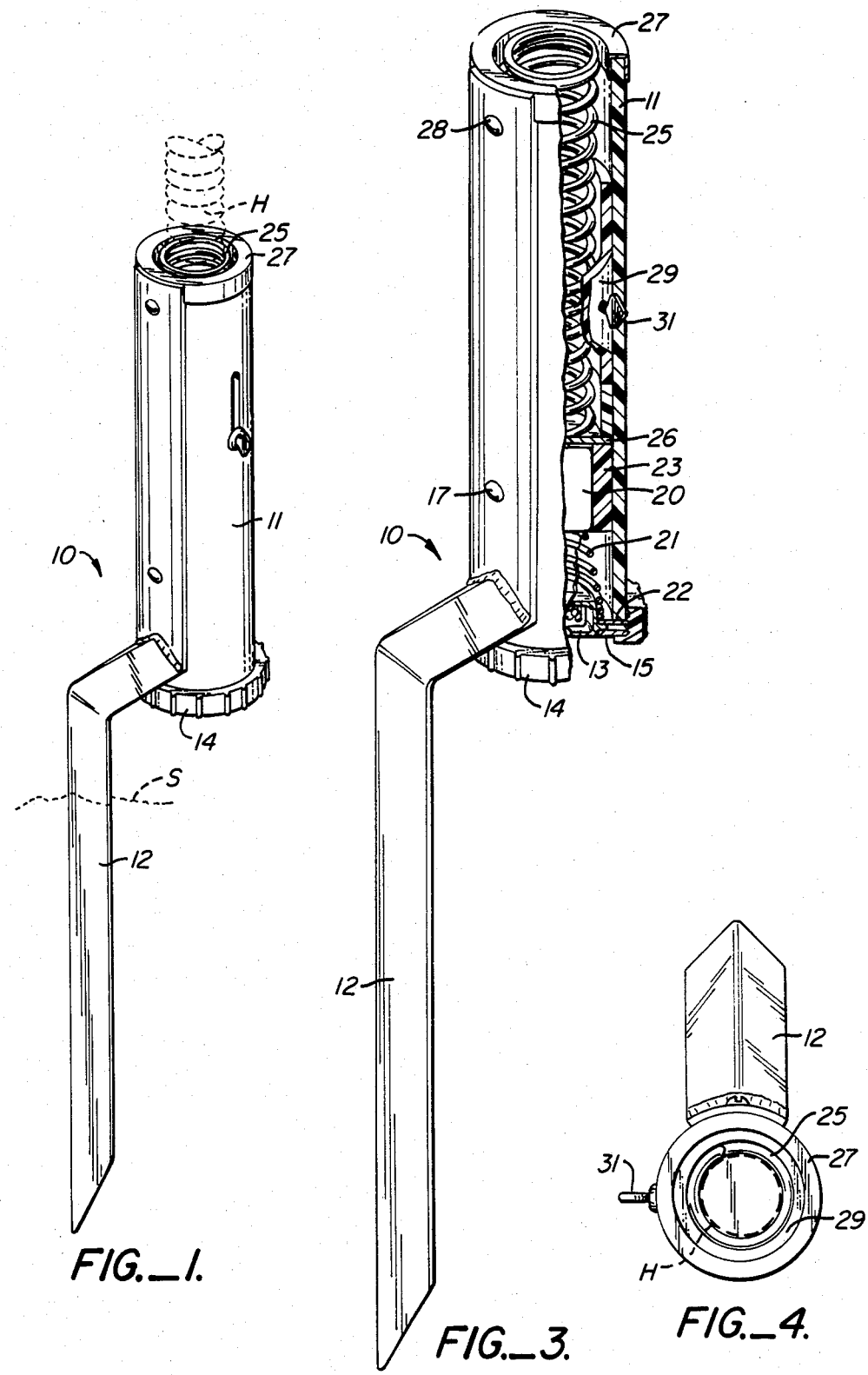

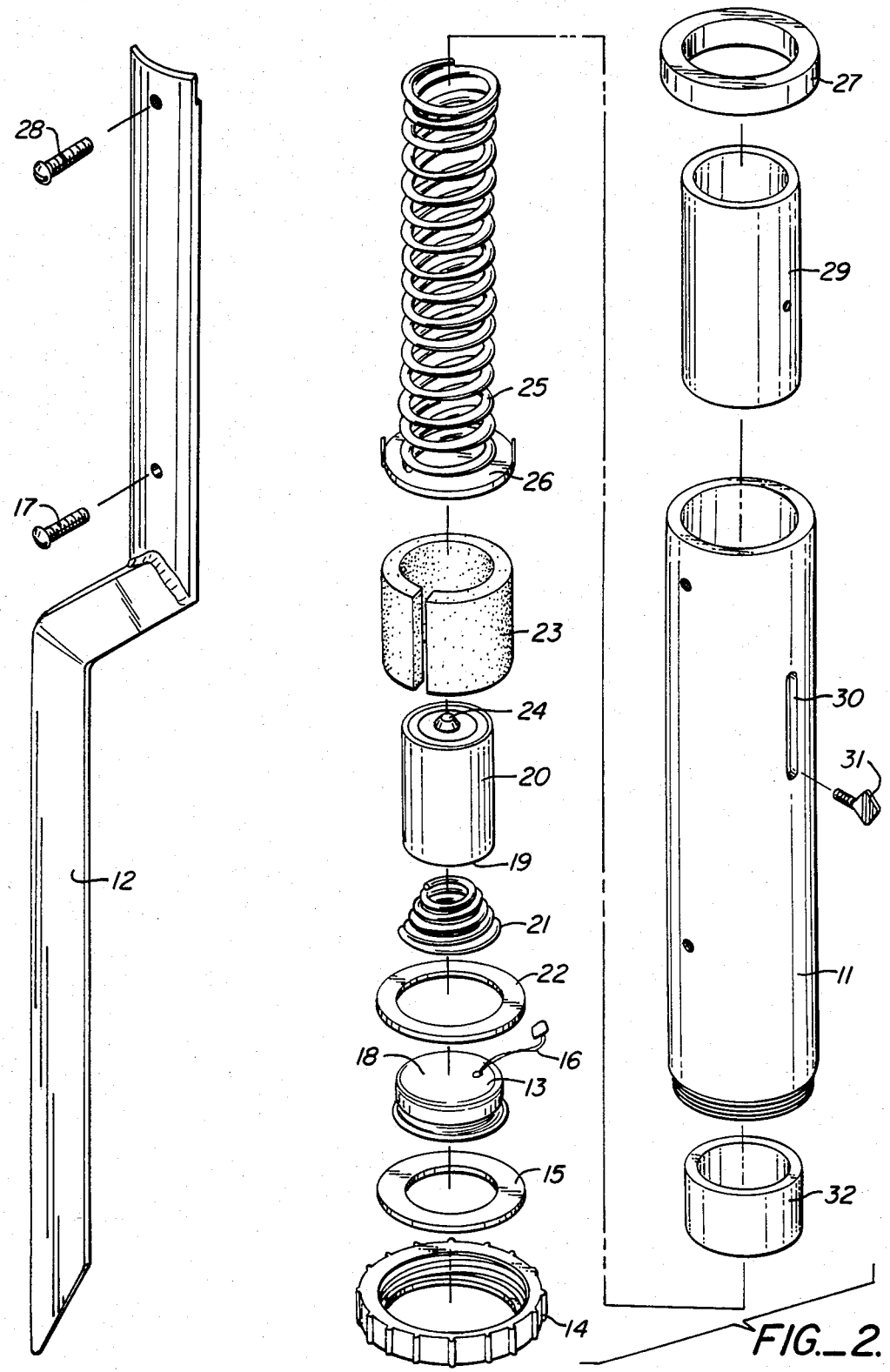
FIG._2.

FISH ALERTER

BACKGROUND OF THE INVENTION

1. Field of the Invention

The present invention relates to fishing rod holders and specifically to a holder with an adjustable sensitivity alarm.

2. Prior Art

Fishing rod holders incorporating line-tension responsive alarms are well-known. U.S. Pat. No. 4,202,125 to Kovacs teaches a rod handle holder which is a tube pivotally mounted on a bracket. A bracket extension ending in a point essentially perpendicular to the longitudinal axis of the tube touches an arc on the outside of the tube midway between two contacts. Increases and decreases in the fishing line tension pivot the tube back and forth so that one or the other of the contacts meets the point of the bracket extension, closes a circuit and activates an alarm. An adjustable spring on the bracket extension regulates resistance to pivotal motion of the tube.

U.S. Pat. No. 4,142,316 to Greer teaches a holder tube held by an anchor stake. The fishing pole handle, or an optional inner tube holding the handle, fits in the tubular holder and is held away from an alarm trigger by a spring. Tension on the line counteracts the spring, and trips the alarm trigger.

U.S. Pat. No. 3,156,997 to Smith teaches a rod holder wherein a tube is centrally pivoted to a stake and held in position by a coil spring surrounding a pin connected between the top of the stake and the top of the tube. A wing nut on the pin regulates spring force. Tension on the fishing line pulls against the spring and pivots the bottom of the tube towards the stake, closing a switch to activate an alarm buzzer.

All three of the prior art devices are activated by line tension in one direction only, although Kovacs may also be activated by a decrease in the same direction. However, whether the fishing pole is positioned on a river bank or in a boat, water and air currents frequently cause the fishing lure to drift from its initial location. This changes the radial angle of the fishing line with respect to the pole and the holder and may hinder operation of a direction dependent alarm.

SUMMARY OF THE INVENTION

It is therefore an object of this invention to provide a fishing rod holder and alarm which responds to increases in fishing line tension radially outward from the pole in any direction. It is a further object to provide a rod holder and alarm which is simple and reliable in construction.

The present invention accomplishes these objects by providing a rod holder comprising a tube supported on a ground stake and housing a long coil spring which holds the rod handle. The spring in turn is surrounded by an insulating sleeve which keeps it from touching the inside of the tube until radial force is applied to the pole. Tension on the fishing line and the handle bends the coil spring over against the tube, closes a circuit and activates an alarm.

BRIEF DESCRIPTION OF THE DRAWINGS

FIG. 1 is an isometric view of the fish alerter planted in sand and showing the rod handle in phantom;

FIG. 2 is an exploded isometric view of the fish alerter;

FIG. 3 is a partially cut away isometric view of the fish alerter; and

FIG. 4 is a top view of the fish alerter showing how the coil spring is spaced from the tube rim.

DETAILED DESCRIPTION OF THE PREFERRED EMBODIMENT

Referring to the figures, the fishing rod holder and alarm of the present invention is generally designated 10. It comprises a housing tube 11, connected along its length to a metal stake 12, by which the holder is planted in sand S, the ground or another foundation.

A buzzer 13 of the type used on bicycles, or any other similar type of alarm desired, is mounted in the bottom of tube 11 and held in place by threaded rim 14 which screws onto the bottom of tube 11. A washer 15 may be used to help rim 14 hold the buzzer. One terminal of buzzer 13 is connected to tube 11 and stake 12 through a wire 16 and screw 17, or equivalent means. The other terminal 18 (in this example, the casing) of buzzer 13 is connected to one terminal of a battery, such as the bottom plate 19 of an ordinary size "D" dry cell 20. The buzzer housing may serve as either of the buzzer terminals. Terminal 18 is held in contact with the battery by a spring 21, which may be below the buzzer, or as shown between buzzer 13 and battery 20. In the latter case spring 21 may also serve as the electrical connection to battery 20. A second washer 22 may be used to clamp a rim on buzzer 13 against the bottom of tube 11.

Dry cell battery 20 is held in tube 11 by a sleeve 23 made of shock absorbent expanded polystyrene or similar material. The top terminal 24 of battery 20 is connected to the lower end of a spring 25, for example, through metal spring contact 26, which preferably has an outside diameter sized to form a friction fit with the inside of tube 11. Spring 25 and contact 26 are preferably held in place by a stationary retainer ring 32.

Spring 25 serves the multiple purposes of actually holding the fishing pole handle (not shown), providing an adjustable tension on the fishing line, and serving as a switch contact for the alarm circuit to be described. Spring 25 should be a rust resistant conductor such as plated spring steel, and should be heavy enough for long use without fatiguing. The spring is of the appropriate length to end near the top of tube 11.

To facilitate conductive contact between the spring and the tube, a "U" cross section rim 27 is mounted on the top edge of tube 11. The top end of stake 12 is preferably attached by screw 28 to the outside of rim 27 to ensure that a conductive path is formed from the top of tube 11 down to the first terminal wire 16 which is connected to buzzer 13.

Spring 25 holds the handle H of a fishing pole towards the center of the housing tube 11. Tension in any radial direction on the fishing line bends spring 25 in an arc against rim 27. When spring 25 touches rim 27, an electric circuit closes between buzzer 13 and battery 20, and the buzzer sounds.

An important feature of this invention, sleeve 29, allows adjustment of the tension needed to bend spring 25 towards rim 27 sufficiently to make a connection. Sleeve 29 surrounds spring 25, centering and insulating it from the inside of tube 11. The bending force on the handle necessary to pull spring 25 against rim 27 depends upon the length of spring 25 between the top of sleeve 29 and rim 27. This length is adjustable by sliding sleeve 29 up and down in tube 11. A longitudinal slot 30 in the wall of tube 11, and a tension adjuster lock screw 31 passing through the slot and into sleeve 29, allow the sleeve to be moved vertically. When sleeve 29 is in the proper position for the desired spring 25 force, screw 31 is tightened to hold the sleeve relative to tube 11.

Details have been disclosed to illustrate the invention in a preferred embodiment of which adaptations and modifications within the spirit and scope of the invention will occur to those skilled in the art. The scope of the invention is limited only by the following claims.

What is claimed is:

1. A fishing rod holder and alarm for use with a fishing rod of the type having an elongate handle, comprising:
    an elongate hollow housing having an open first end and a second end;
    a conductive ring mounted to the inside surface of the housing near the first end;
    a conductive spring mounted within the housing;
    means for centering a first portion of the spring within the housing and leaving a second portion of the spring adjacent the conductive ring free to be bent in any radical direction; and
    an alarm circuit, including the ring, the spring, and an alarm device, said alarm circuit being adapted to be completed and to actuate the alarm when the fishing pole radially biases the spring to contact the ring.

2. The rod holder and alarm of claim 1 wherein the housing is generally cylindrical.

3. The rod holder and alarm of claim 1 wherein the conductive ring defines the rim of the housing at the open first end.

4. The rod holder and alarm of claim 1 wherein the housing is hollow from the first end to the second end.

5. The rod holder and alarm of claim 1 wherein the spring is a coil spring.

6. The rod holder and alarm of claim 1 wherein the means for centering is adjustably mountable at a plurality of positions inside, and along the longitudinal axis of, the housing.

7. The rod holder and alarm of claim 1 wherein the means for centering includes a tubular member mounted between the spring and the housing.

8. The rod holder and alarm of claim 7 wherein the tubular member is cylindrical.

9. The rod holder and alarm of claim 7 wherein the housing includes a longitudinally extending slot and the means for centering includes a radially releasable clamp passing through the slot to allow a user to position and secure the tubular member longitudinally within the housing, thereby varying the radial force required to be exerted by the handle to bend the spring into contact with the ring.

10. The rod holder and alarm of claim 1 including a stake mounted to the housing and having a pointed end extending past the second end of the holder.

11. The rod holder and alarm of claim 1 wherein the alarm device is a buzzer.

12. A fishing rod holder and line tension alarm comprising:
    a tubular housing having an open first end with a conductive rim, a second end, and a longitudinal slot near the open end;
    a coil spring with an outside diameter less than the inside diameter of said rim and with a length less than said housing, having a first end close to said rim and having a second end;
    electric alarm means including means for receiving electric power, and having first and second conductive terminals connected in series between said rim and the second end of said spring;
    a slidable sleeve between said spring and said housing;
    releasable clamp means connected to said sleeve and slidable along said slot, for clamping said sleeve at a desired position in said housing, thereby varying the length of the spring extending between said sleeve and said rim and the radial force on said spring necessary to bend it against said rim and close an electrical circuit through said battery and said alarm means.

13. A holder and alarm as in claim 12 and wherein said electric alarm means is an audio signalling device having two device terminals, said first conductive terminal is one of the signalling device terminals, and said second conductive terminal and the other of the signalling device terminals are the means for receiving electric power, and further comprising an electric cell for supplying power between said means for receiving electric power.

14. A holder and alarm as in claim 13 and wherein said electric alarm means is an audio alarm disposed within, and adjacent the second end of, said housing.

* * * * *